United States Patent Office 3,563,812
Patented Feb. 16, 1971

3,563,812
METHOD FOR GAS CUTTING WHILE USING SHIELD GAS
Minoru Nakanishi and Hidehiko Hayasaki, Tokyo, Japan, assignors to Kabushiki Kaisha Tanaka Seisakusho
Continuation-in-part of application Ser. No. 681,055, Oct. 24, 1967, which is a continuation-in-part of application Ser. No. 535,885, Mar. 21, 1966. This application Apr. 3, 1968, Ser. No. 725,249
Int. Cl. B23k 7/00
U.S. Cl. 148—9                                                6 Claims

ABSTRACT OF THE DISCLOSURE

A method for gas cutting metal utilizing a main stream of oxygen for the cutting and an oxygen curtain surrounding said main stream to maintain the purity of said main stream wherein cut quality is dependent upon the curtain oxygen momentum and the head pressure of the main stream of oxygen.

CROSS REFERENCE TO RELATED APPLICATIONS

This application is a continuation-in-part of applicants' copending application Ser. No. 681,055, filed Oct. 24, 1967, and now abandoned, which in turn is a continuation-in-part of applicants' copending application Ser. No. 535,885, filed Mar. 21, 1966, now Pat. No. 3,389,861.

BACKGROUND OF THE INVENTION (1) Field of the invention

This invention relates to a method for gas cutting, more particularly, an efficient method for obtaining a high quality cut by surrounding a cutting oxygen gas stream with a curtain oxygen stream having a velocity lower than that of said cutting gas stream.

(2) Description of the prior art

A process of gas cutting comprises steps of heating a certain portion of the surface of a metal article to be treated by means of a high temperature preheating flame, such as an "oxygen-acetylene flame, an oxygen-propane flame, petroleum gas flame, natural gas flame, etc., until the temperature of said portion of said metal article is raised to its ignition temperature and blowing a stream of highly refined oxygen to the preheated portion to oxidize and burn said portion thereby cutting said metal article at said portion. It is well known that the efficiency of such a process of gas cutting is mainly determined by the purity of oxygen in the cutting oxygen stream. Accordingly, it is preferred to use highly purified oxygen in said process of gas cutting. For example, in an Industrial Standard it is stipulated that the purity of oxygen for such purposes should be at least 99.5% and the purity of oxygen actually used in various industries at present is not less than 99.7% in most cases.

In actual cutting operations, however, during the period of time when the cutting oxygen gas stream travels from an ejecting nozzle of a blow pipe to the preheated portion of a metal article to be cut, said cutting oxygen stream must pass through an atmosphere of the preheating flame when a concentric nozzle is used or through air when a non-concentric nozzle is used, and hence certain amounts of impurities, such as the preheating gas and other impurities in the air, are dissolved in said cutting oxygen stream to reduce its purity thereby the efficiency in the gas cutting process is reduced.

In an effort to overcome this problem, certain prior art devices utilized a concentric curtain of low pressure oxygen around the high pressure cutting oxygen stream which in turn was surrounded by a concentric curtain of preheating gas such as acetylene or the like. Although such an arrangement is similar to the present arrangement, the mere presence of a curtain of oxygen did not provide the desired high quality cut. For example, in making a cut, the piece would not drop and the face of the cut would be bellied and rough. On other occasions, even though the piece dropped, the edges would be rounded and the surface gouged. In both instances a slag would be formed which was exceedingly difficult to remove.

SUMMARY OF THE INVENTION

The principal object of the invention is to obviate said difficulties in conventional methods by providing a novel method of gas cutting, in which the cutting oxygen gas stream is surrounded by a protective curtain of oxygen to prevent the reduction in the purity of oxygen in the cutting stream, and to accelerate the oxidizing reaction in an efficient manner.

Another object of the present invention is to provide an improved method of gas cutting wherein the cut quality is dependent on the curtain oxygen momentum and the head pressure of the main cutting jet.

A further object of the invention is to provide an improved method of thermo-chemical metal removal wherein the quality of the surface is dependent on the curtain oxygen momentum and the head pressure of the main cutting jet.

Other objects of the invention will be pointed out in the following description and claims and illustrated in the accompanying drawings which disclose by way of example the principles of the invention and the best mode which has been contemplated of applying those principles.

BRIEF DESCRIPTION OF THE DRAWINGS

For a better understanding of the invention, reference is made to the accompanying drawings, in which:

FIGS. 3c and 3d are diagrammatic illustrations of dispositions of nozzles in the device of FIG. 3a;

FIG. 4c is a sectional view illustrating a different form of nozzle to be used in the device of FIG. 4a;

FIG. 4d is a sectional view illustrating a different form of nozzle to be used in the device of FIG. 4a;

FIG. 5c is a sectional view of a nozzle to be used in the device of FIG. 5a;

DETAILED DESCRIPTION OF THE INVENTION

Figure 1A:
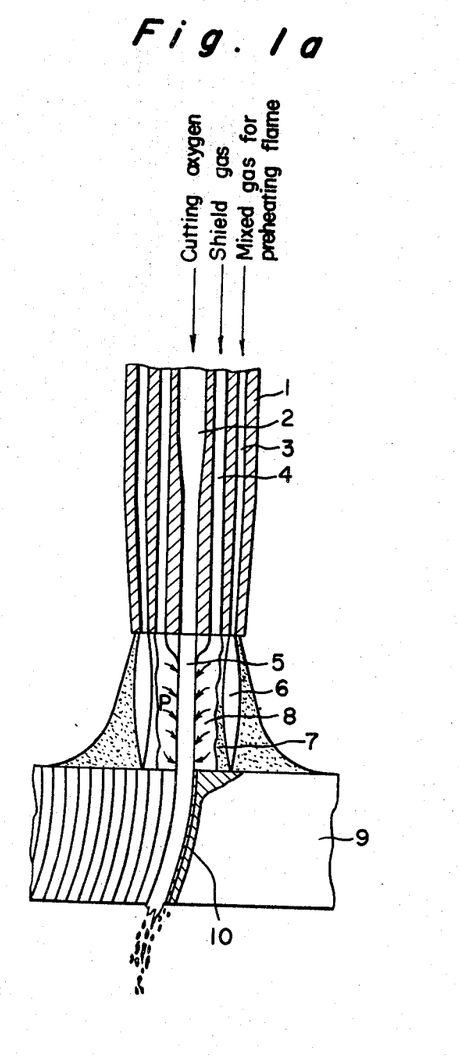
FIGS. 1a and 1b are diagrammatic illustrations of principles of the method of the invention.
Figure 1B:
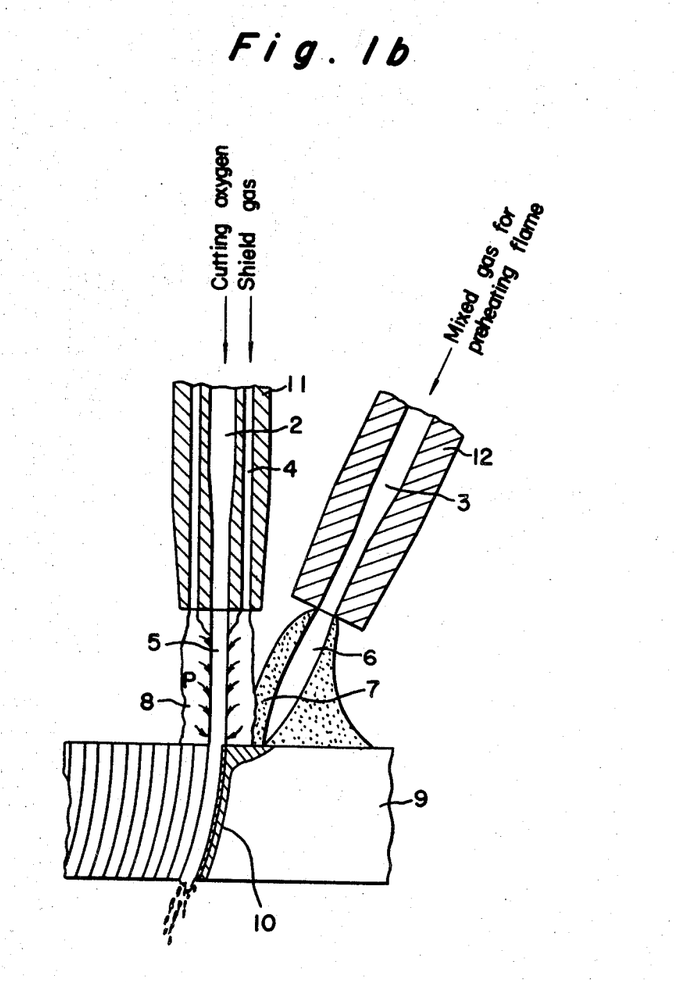
Figure 2A:
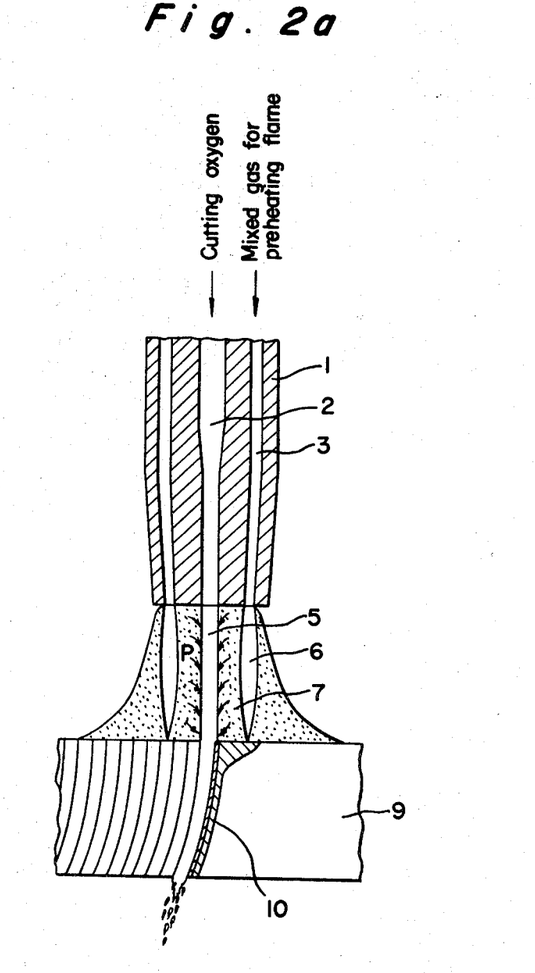
FIGS. 2a and 2b are similar illustrations to FIGS. 1a and 1b, respectively, to show principles of conventional methods of gas cutting.
Figure 2B:
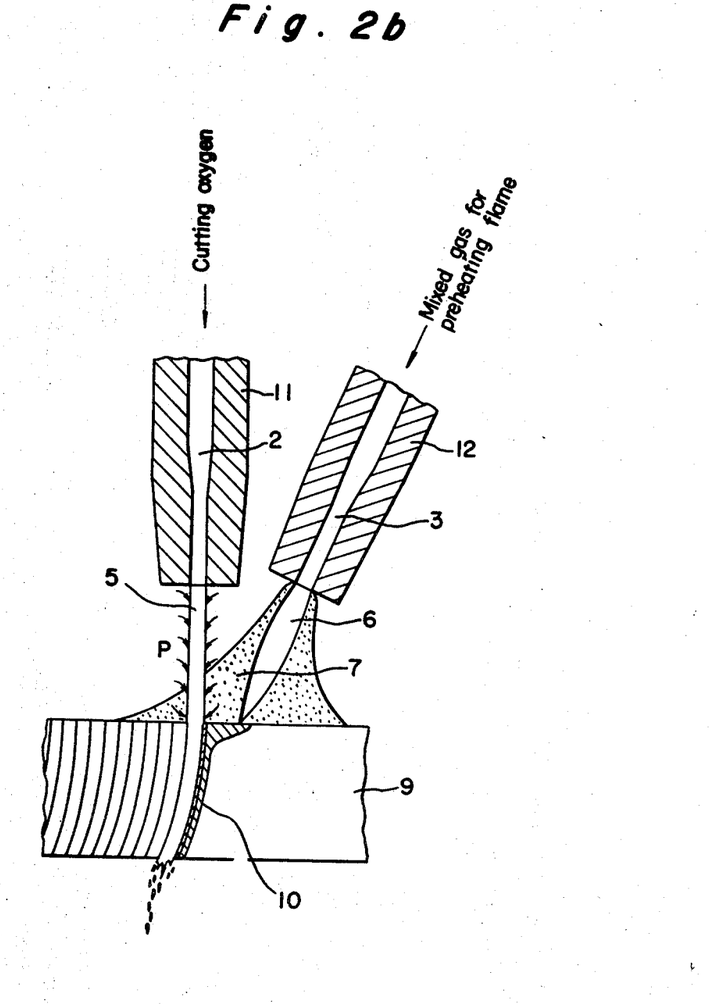

FIG. 1a illustrates operative principles of a gas cutting device embodying the invention, which is provided with concentric nozzles, while FIG. 1b illustrates operative principles of a similar cutting device having nonconcentric nozzles. FIGS. 2a and 2b are similar views to FIGS. 1a and 1b, respectively, illustrating operative principles of conventional prior art methods of gas cutting.

In the cutting device of FIG. 2a, a cutting oxygen stream 5 is ejected from a passageway 2 formed at the center of a nozzle 1, while a stream of gaseous mixture to produce a preheating flame is ejected either from an annular opening formed along the outer periphery of said oxygen passageway 2 in a concentric manner therewith or from a plurality of openings disposed along a circle concentric with said oxygen passageway 2. The stream of gaseous mixture is burned upon ejection from said nozzle 1 and produces a primary flame 6 and a secondary flame 7 to heat the surface of metal article 9 to be cut. The metal in the reacting zone 10 is burned by reacting with the cutting oxygen stream 5, thereby the metal article 9 is cut off.

The cutting oxygen stream 5 usually flows at a sonic or supersonic speed, and attracts the atmospheric gas 7 surrounding the oxygen stream, as shown by arrows P in the figure. Accordingly, the purity of the cutting oxygen stream at the reacting zone 10 is reduced to cause reduction in the efficiency of combustion and hence reduction in the efficiency of the cutting process.

On the other hand, the method of the present invention is performed with the cutting nozzle as shown in FIG. 1a wherein a shield gas stream or curtain stream of oxygen 8 is ejected from a passageway 4 which is disposed in the nozzle 1 concentric to the cutting passageway 2. Passageway 4 may be either an annular opening or a plurality of small holes disposed in a circle around the cutting passageway 2. The gaseous mixture for preheating is ejected from holes 3 disposed in a circle concentric to the passageway 4 outwardly thereof. The gaseous mixture for supplying the preheating flame will be self-supporting and of proper heating value to effect preheat without relying on any oxygen from the shielding oxygen stream.

According to the method of the present invention, the cutting oxygen stream 5 is protected by a shielding oxygen stream 8 and the purity of the oxygen stream 5 is not affected by gaseous compounds produced by the frames indicated at 6 and 7 in FIG. 1a. In other words, by utilizing the device shown in FIG. 1a, the cutting gas stream will attract gas from the surrounding atmosphere as shown by the arrow P. However, since the cutting gas stream 5 is surrounded by a shielding oxygen stream 8 which is also pure oxygen, the purity of the oxygen in the cutting stream 5 will be affected by such an attraction. Accordingly, there is no reduction in the efficiency of the chemical reaction and the cutting operation.

It is also possible to use other shielding gases which will accelerate the oxidizing reaction to improve the efficiency of the reaction and the efficiency of the cutting operation.

FIG. 2b illustrates a conventional device for gas cutting, in which the cutting gas passageway 2 is bored along the axial center line of a cutting nozzle 11 to eject the cutting oxygen stream 5. The preheating flames 6 and 7 are produced by burning the gas ejected from the passageway 3 bored along the axial center line of a preheating nozzle 12, which is separated from said cutting nozzle 11. The oxygen gas stream 5 ejected from the cutting nozzle 11 is reacted with the metal 9 to be cut at the reacting surface 10 thereof and burned, and said oxygen gas absorbs adjacent atmosphere or air in this case too, as shown by arrows P of the figure, and hence the purity of the oxygen gas is reduced and the efficiency of the cutting operation is also deteriorated.

In an embodiment of the invention shown in FIG. 1b, the cutting oxygen gas stream 5 is protected by the shielding gas 8 to eliminate any reduction of the purity of the cutting oxygen gas and of the efficiency of the cutting operation due to said attraction of the surrounding atmosphere. In this embodiment, it is also possible to improve the efficiency of said oxidizing reaction and the efficiency of cutting operation by using such a shielding gas which accelerates the oxidizing reaction.

Figure 3A:
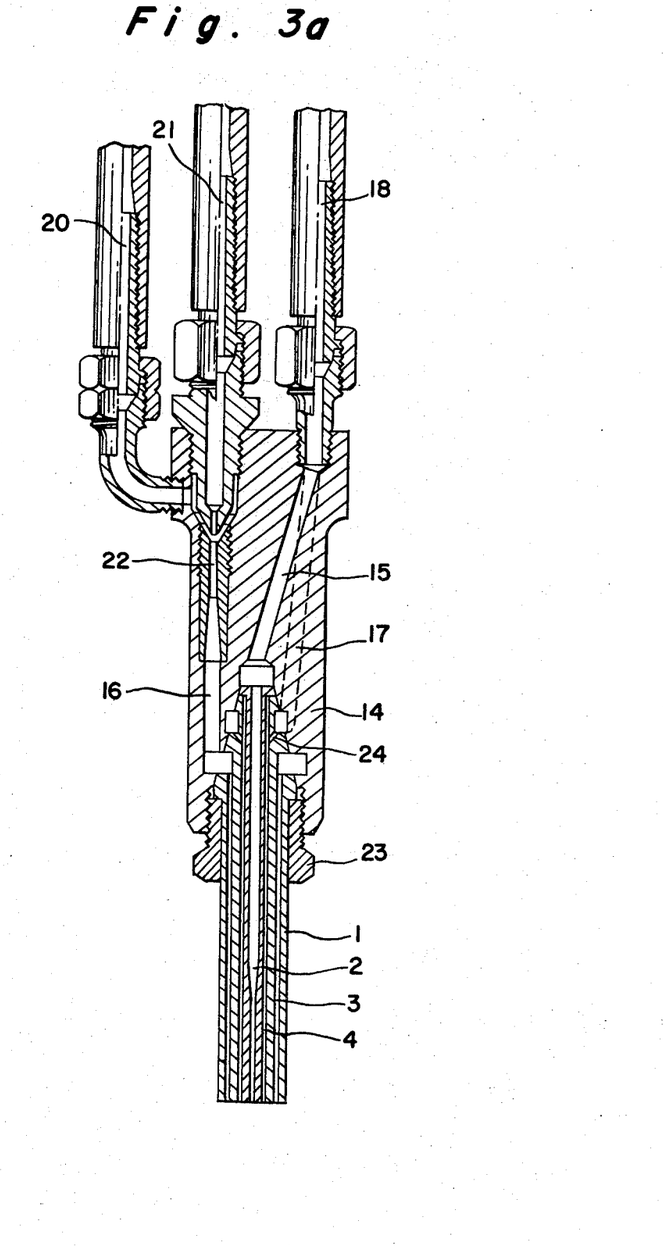
FIG. 3a is a vertical sectional view of a cutting device embodying the method of the invention.

FIG. 3a is a vertical sectional view of a device for gas cutting according to the invention, in which 14 is a blow pipe, to which end a nozzle is connected by means of a nut 23. The preheating oxygen gas is fed through an inlet opening 21 while the preheating fuel gas is fed through another inlet opening 20 to be mixed with said preheating oxygen gas at a mixer 22 and ejected out of the nozzle through the passageways 16 and 3 formed in the blow pipe 14 and in the nozzle 1, respectively.

Figure 3B:
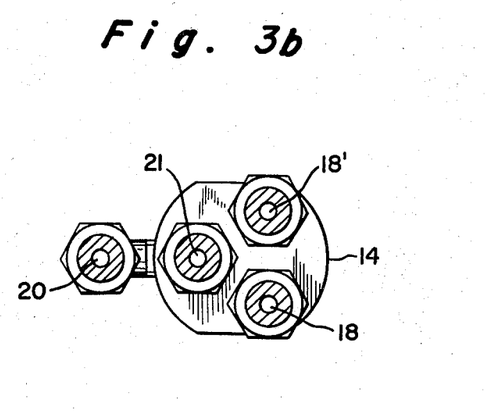
FIG. 3b is a top view of the same.

On the other hand, the cutting oxygen gas is fed into the blow pipe 14 through another inlet opening 18 and then led to the passageway 2 of the nozzle through a passageway 15 in the blow pipe. The shield gas is fed into the blow pipe 14 through another inlet opening 18', as shown in FIG. 3b, and ejected out of the nozzle 1 through a passageway 17 in the blow pipe 14, a hole 24 and a passageway 4 of the nozzle 1.

Figure 3C:
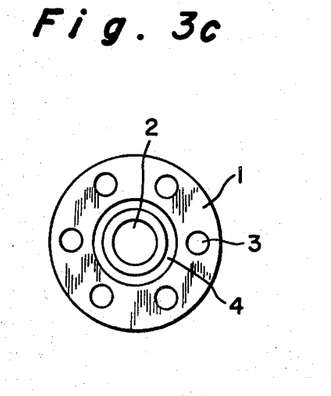
Figure 3D:
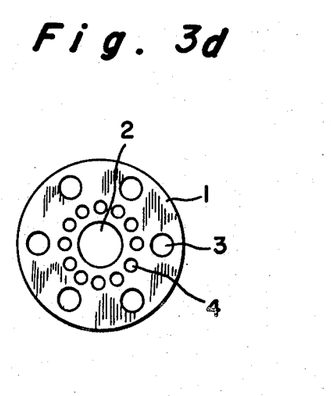

FIG. 3c illustrates a traverse sectional view of the nozzle 1 having an annular passageway 4 for the shield gas, while FIG. 3d, a similar view to FIG. 3c, illustrating a nozzle having shield gas passageway comprising a plurality of small holes. As shown in FIGS. 3c and 3d, the shield gas passageway 4 is so disposed as to provide a substantially large resistance against gas flow therethrough than that of the cutting oxygen gas passageway 2, thereby a shield gas stream having a speed lower than that of the cutting oxygen gas stream is produced. The disposition of passageways 2, 3 and 4 is not limited to those shown in FIGS. 3c and 3d, but any other suitable arrangement, such as a combination of dispositions shown in the figures, can be also used.

Figure 4A:
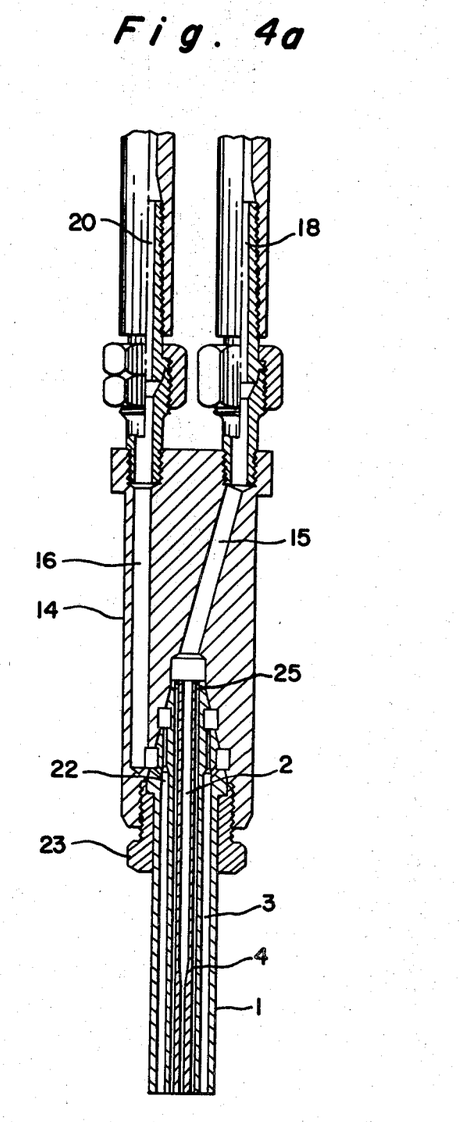
FIG. 4a is a vertical sectional view of another cutting device according to the method of the invention.
Figure 4B:
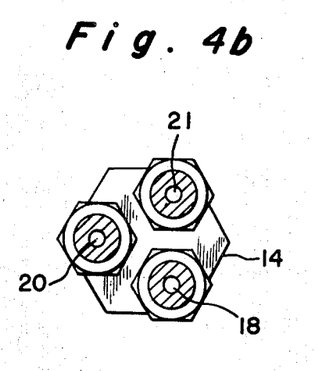
FIG. 4b is a top view of the same.
Figure 4C:
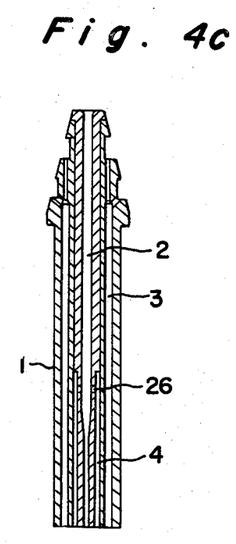
Figure 4D:
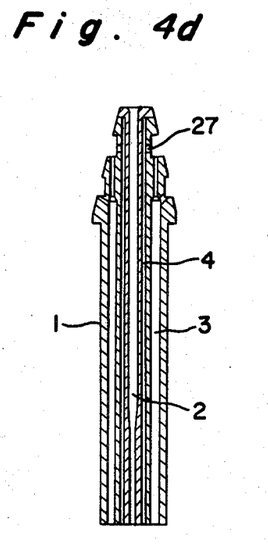

FIGS. 4a to 4c illustrate a tip-mixing type blow pipe, or a blow pipe having a gas mixer in its nozzle, embodying the invention, wherein a part of the cutting oxygen gas is used as shield gas. In the nozzle of FIG. 4a the cutting oxygen gas passing through the pasasgeway 15 is used not only for cutting operation through the passageway 2, but for shielding through fine holes 25 in the nozzle and the pasasgeway 4. With the nozzle shown in FIG. 4c, a part of the cutting oxygen gas is used for shielding through fine holes 26. In the case of the nozzle of FIG. 4d a part of the preheating oxygen gas is used as a shield gas through fine holes 27.

Figure 5A:
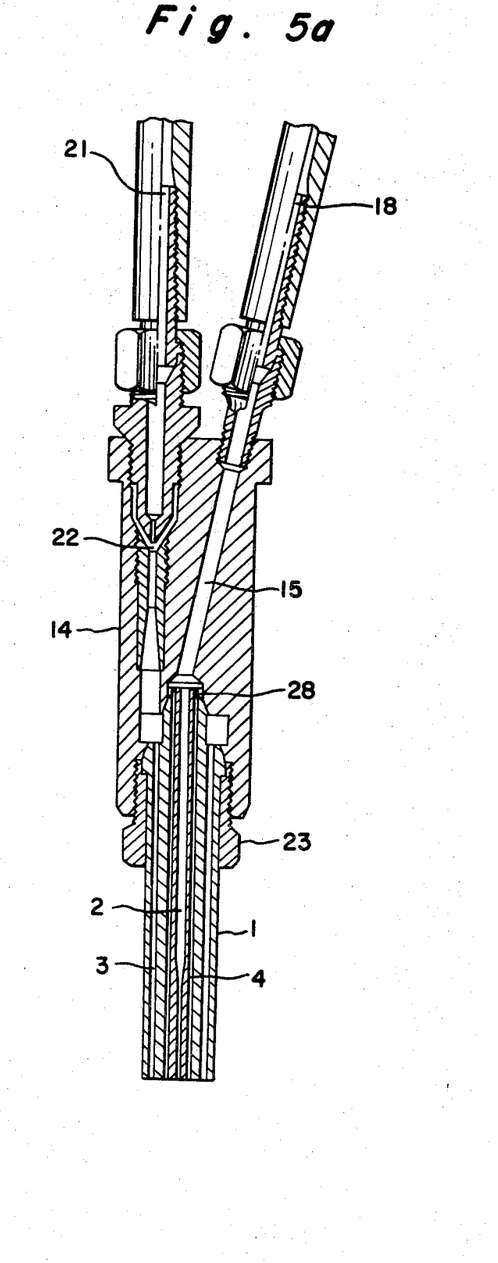
FIG. 5a is a vertical sectional view illustrating another embodiment of the invention.
Figure 5B:
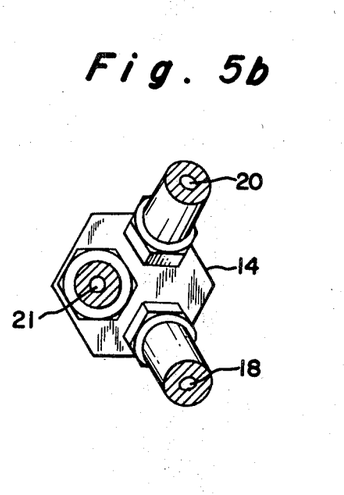
FIG. 5b is a top view of the same.
Figure 5C:
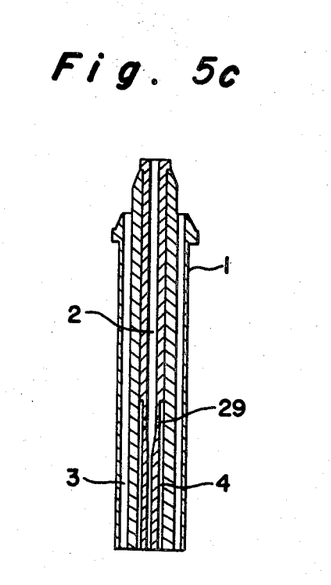

FIGS. 5a to 5c illustrate a torch-mixing type blow pipe, or a blow pipe having a gas mixer therein, embodying the method of the invention, wherein a part of the cutting oxygen is used as shield gas. In the blow pipe of FIG. 5a, fine holes 28 facilitate diversion of a part of the cutting oxygen gas for the use as shield gas, while in the case of the device of FIG. 5c, such diversion is fulfilled through small holes 29 bored between passageways 2 and 4.

As described in the foregoing, according to the present invention, when a tubular shielding gas stream is ejected so as to enclose the periphery of a cutting oxygen gas stream for gas cutting, the reduction in purity of the oxygen gas due to mixture of impurities, such as air, into the pure oxygen in the cutting stream is substantially eliminated. Therefore, the method of the present invention for gas cutting makes it possible to carry out cutting operations at a higher speed to produce smoother surfaces of good flatness as compared with those obtained by conventional methods of gas cutting. Besides, according to the method of the present invention, there will be no excessive and undesirable melting at the top edge of the cutting metal surface. Thus, the method of the present invention materially contributes to the art of gas cutting.

Figure 9:
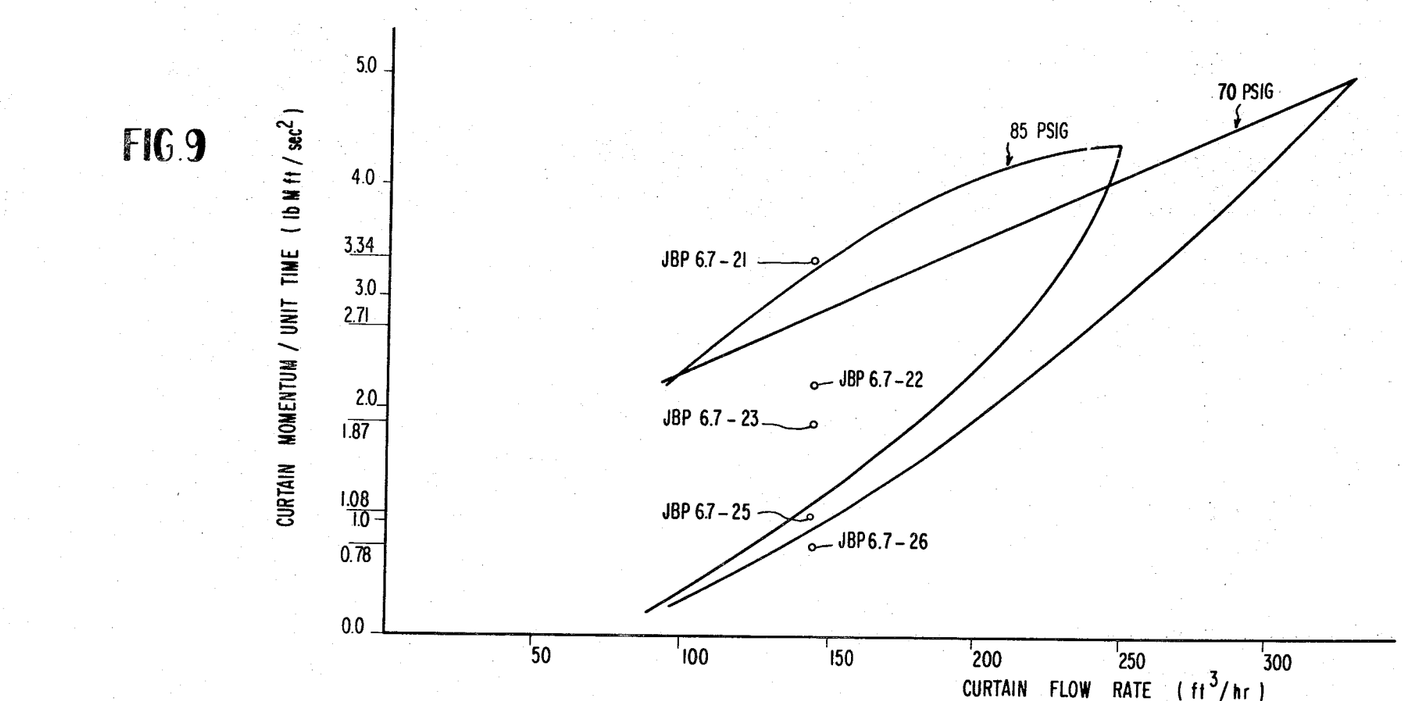
FIG. 9 is a graph showing the relation of curtain momentum to curtain flow rate.

A detailed analysis of the gas flow rates and the operating pressures for the various streams emanating from the nozzle of the present invention reveals that there is a range of curtain jet momentum, expressed as pounds of mass×feet/sec.², within which suitable cut quality is obtained. This range is dependent upon the curtain flow rate and as the curtain flow rate is increased curtain momentum increases. The range of allowable curtain jet momentum narrows with increased curtain flow until, at some point, good quality cuts cannot be produced. Furthermore, the optimum region of operation is a function of head pressure of the main cutting jet. These relationships between curtain momentum, curtain flow and head pressure of the cutting gas are most clearly shown in FIG. 9. The region within the curved lines on the graph includes the values of acceptable curtain momentum at 85 p.s.i.g. and the region within the straight lines includes the values of acceptable curtain momentum at 70 p.s.i.g. When cuts are made below the allowable ranges, as indicated on the graph of FIG. 9, the edges of the cuts will be rounded and/or severe gouging will occur. When the cuts are made when operating above the allowable range, as indicated on the graph of FIG. 9, the cuts will be bellied and rough.

The above results may be more clearly seen from the test results obtained using each of five different nozzles. The data for each test may be seen in Table I and the first result may be more clearly seen by referring to the graph of FIG. 9 which clearly shows the curtain momentum per unit time for each nozzle when using a curtain flow rate of 145 c.f.h. and a cutting gas pressure of 70 p.s.i.g. The following is a summary of the results obtained for each of the five nozzles.

JBP6.7-21.—Piece did not drop. Face of cut was bellied and quite rough. Slag difficult to remove. This nozzle configuration was outside the allowable range.

JBP6.7-22 and JBP6.7-23.—Smooth, fairly straight cuts. Slag easily removed. Both pieces dropped. Nozzles within acceptable range.

JBP6.7-25.—Piece did not drop. Surface gouged at points. Rounded as well. Nozzle at edge of specified range.

JBP6.7-27.—Piece dropped but quite rounded. At least 10 gouges present. Slag difficult to remove. This nozzle was definitely outside acceptable range.

helps to prevent the central cutting jet from over expanding. Normally, a nozzle operating at 85 p.s.i.g. will over expand upon exiting the nozzle. The curtain prevents this from occurring and thus a dense low turbulence jet results. The presence of a curtain stream of suitable properties results in a straight kerf without bellying.

Figure 8:
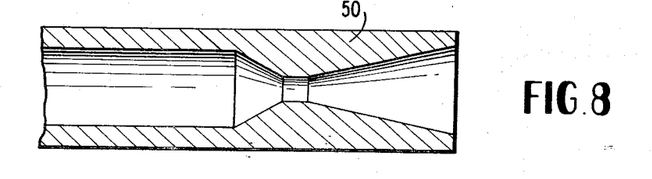
FIG. 8 is a sectional view of a prior art divergent nozzle.

The relative cutting performance based on straight line speeds between a standard divergent nozzle, such as the nozzle 50 shown in FIG. 8 and a cylindrical curtain nozzle such as shown in FIG. 1a may be seen from the following table.

TABLE II.—RELATIVE CUTTING PERFORMANCE BASED ON STRAIGHT LINE SPEEDS

| Plate thickness, inches | Standard divergent nozzle | | | | Cylindrical curtain nozzle | | |
|---|---|---|---|---|---|---|---|
| | Type 1535, size, No.— | Cutting oxygen pressure, p.s.i.g. | Cutting speed, i.p.m. | Total oxygen flow rate, c.f.h. | Bore dia., inches | Cutting speed, i.p.m. | Total oxygen* flow rate, c.f.h. |
| ½ | 31 | 75 | 21 | 100 | .051 | 30 | 370 |
| 1 | 43 | 70 | 19 | 160 | .055 | 27 | 510 |
| 1½ | 52 | 70 | 15 | 220 | .067 | 23 | 645 |
| 2 | 60 | 75 | 14 | 280 | .073 | 21 | 710 |
| 3 | 60 | 85 | 10 | 310 | .081 | 16 | 780 |
| 4 | 60 | 100 | 8 | 360 | .089 | 14 | 880 |

*Flow rates at 85 p.s.i.g.

Figure 6:
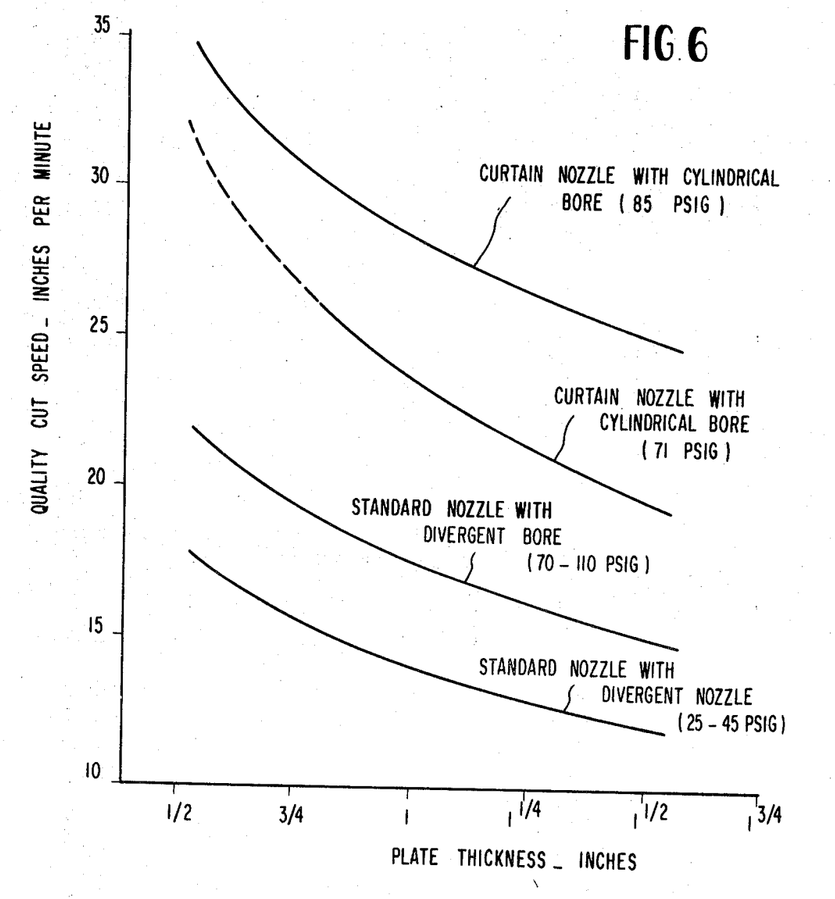
FIG. 6 is a graph showing the relation between quality cut speed and plate thickness for several different nozzles at varying pressures.

FIG. 6 shows a graphical relationship of the quality cut speed versus plate thickness. The four curves shown on the graph, reading from the top down, are for a curtain nozzle with a cylindrical bore having a cutting stream pressure of 85 p.s.i.g., a curtain nozzle with a cylindrical bore having a cutting stream pressure of 71 p.s.i.g., a standard nozzle with a divergent bore having a cutting stream pressure range of 70–110 p.s.i.g. and a standard nozzle with a cylindrical bore having a cutting stream range of 25–45 p.s.i.g., respectively. Thus, it is clearly shown by these graphical results that a curtain nozzle having a cylindrical bore, such as shown in FIG. 1a, provides a much greater quality cut speed than the standard nozzles having a divergent bore or a cylindrical bore.

Obviously, many modifications and variations of the present invention are possible in the light of the above teachings. It is therefore to be understood that within the scope of the appended claims, the invention may be practiced otherwise than as specifically described.

What is claimed is:

1. A method of thermal-chemical removal of metal using a main metal removing oxygen stream and a curtain stream of oxygen comprising:
   (a) directing a mixture of fuel gas and oxidizing gas toward a metal article to supply a self-supporting preheat flame of proper heating value,
   (b) directing a main oxygen stream having a minimum pressure of 50 p.s.i.g. toward said preheated metal article to supply a metal removing flame, and

TABLE I

| Nozzle | Cutting O₂ | | Preheat | | Curtain O₂ flow | | Cutting speed (i.p.m.) | Stand-off (in.) | Plate thickness (in.) | Curtain area (ft.²) | Curtain velocity (f.p.s.) | Curtain momentum (lb.m.-ft./sec.²) |
|---|---|---|---|---|---|---|---|---|---|---|---|---|
| | Pres. (p.s.i.g.) | Flow (c.f.h.) | O₂ flow (c.f.h.) | CH₄ flow (c.f.h.) | (c.f.h.) | (ft.³/sec.) | | | | | | |
| JBP6.7-21 | 70 | 435 | 145 | 71 | 145 | 0.0403 | 20 | 5/32 | 1½ | 0.0000263 | 1,000 | 3.34 |
| JBP6.7-22 | 70 | 435 | 120 | 71 | 145 | 0.0403 | 21 | 5/32 | 1½ | 0.0000498 | 807 | 2.71 |
| JBP6.7-23 | 70 | 435 | 144 | 80 | 145 | 0.0403 | 23 | 5/32 | 1½ | 0.0000719 | 560 | 1.87 |
| JBP6.7-25 | 70 | 435 | 155 | 95 | 145 | 0.0403 | 22 | ¼ | 1½ | 0.000125 | 322 | 1.08 |
| JBP6.7-27 | 70 | 435 | 144 | 80 | 145 | 0.0403 | 22 | 5/32 | 1½ | 0.000170 | 236 | 0.78 |

Figure 7:
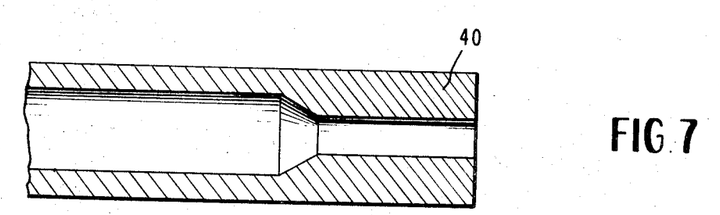
FIG. 7 is a sectional view of a prior art cylindrical nozzle.

As compared with conventional nozzles 40 and 50 shown in FIGS. 7 and 8, the curtain nozzle of the present invention enables much higher cutting speeds which still obtain a good quality cut. This may be attributed to the fact that more oxygen is supplied to the reaction zone and the oxygen curtain protects the inner stream from contaminants aspired from the surrounding air and the combustion gases or products of combustion. Also the curtain (c) providing a curtain stream of oxygen around said main stream of oxygen having a flow rate in the range of 50–300 ft.³/hr. and having a momentum per unit time in the range of 0.5–4.5 lb. m.-ft./sec.².

2. The method as set forth in claim 1 wherein said main oxygen stream is discharged through a divergent nozzle.

3. The method as set forth in claim 1 wherein said main oxygen stream is discharged through a cylindrical nozzle.

4. A method of gas cutting using a cutting oxygen stream and a curtain stream of oxygen comprising:
   (a) directing a mixture of fuel gas and oxidizing gas toward a metal article to supply a self-supporting preheat flame of proper heating value,
   (b) directing a cutting oxygen stream having a minimum pressure of 50 p.s.i.g. toward said preheated metal article to supply a cutting flame, and
   (c) providing a curtain stream of oxygen around said cutting oxygen stream having a flow rate in the range of 50–300 ft.$^3$/hr. and having a momentum per unit time in the range of 0.5–4.5 lb. m.-ft./sec.$^2$.

5. The method as set forth in claim 4 wherein said cutting oxygen stream is discharged through a divergent nozzle.

6. The method as set forth in claim 4 wherein said cutting oxygen stream is discharged through a cylindrical nozzle.

References Cited

UNITED STATES PATENTS

| | | | |
|---|---|---|---|
| 2,210,402 | 8/1940 | Gaines, Jr. | 148—9 |
| 2,210,403 | 8/1940 | Skinner | 148—9 |

L. DEWAYNE RUTLEDGE, Primary Examiner

W. W. STALLARD, Assistant Examiner